United States Patent
Petrilak et al.

(10) Patent No.: US 10,116,694 B2
(45) Date of Patent: Oct. 30, 2018

(54) NETWORK SIGNALING INTERFACE AND METHOD WITH ENHANCED TRAFFIC MANAGEMENT DURING SIGNALING STORMS

(71) Applicant: MARKPORT LIMITED, Dublin (IE)

(72) Inventors: Tomas Petrilak, Menin (CZ); Victor Scripcaru, Voorburg (NL); Ilia Abramov, Amersfoort (NL)

(73) Assignee: Markport Limited, Dublin (IE)

( * ) Notice: Subject to any disclaimer, the term of this patent is extended or adjusted under 35 U.S.C. 154(b) by 172 days.

(21) Appl. No.: 15/241,637

(22) Filed: Aug. 19, 2016

(65) Prior Publication Data

US 2016/0359902 A1 Dec. 8, 2016

Related U.S. Application Data

(63) Continuation of application No. PCT/EP2015/050230, filed on Jan. 8, 2015.

(30) Foreign Application Priority Data

Feb. 20, 2014 (EP) .................................. 14156046

(51) Int. Cl.
*G06N 5/02* (2006.01)
*H04Q 3/00* (2006.01)
*H04L 29/06* (2006.01)
*H04W 28/02* (2009.01)

(52) U.S. Cl.
CPC ........... *H04L 63/1458* (2013.01); *G06N 5/02* (2013.01); *H04Q 3/0091* (2013.01); *H04W 28/0247* (2013.01); *H04W 28/0273* (2013.01); *H04L 2463/142* (2013.01)

(58) Field of Classification Search
CPC .................................................... H04Q 3/0091
See application file for complete search history.

(56) References Cited

U.S. PATENT DOCUMENTS

| | | | |
|---|---|---|---|
| 9,391,897 B2 * | 7/2016 | Sparks | H04L 47/11 |
| 2011/0040845 A1 * | 2/2011 | Cai | H04L 47/10 709/206 |
| 2011/0158090 A1 | 6/2011 | Riley et al. | |
| 2012/0092995 A1 * | 4/2012 | Arvidsson | H04L 47/10 370/235 |

(Continued)

OTHER PUBLICATIONS

European Search Report dated Oct. 3, 2016 from corresponding EP Application No. 15700107.4, 3 pages.

(Continued)

*Primary Examiner* — Madhuri R Herzog
(74) *Attorney, Agent, or Firm* — Ohlandt, Greeley, Ruggiero & Perle, L.L.P.

(57) ABSTRACT

A signaling controller (DSC) performs dynamic management in networks such as Evolved Packet Core (EPC) networks that rely on Diameter signaling interfaces. The controller executes in real time a self-adjusting algorithm that achieves user-based service continuity during signaling storms or congestion situations. The algorithm is self-adjusting on the basis of comparing a signaling and peer group values which are dynamically determined. The dynamic determination of these values is based on items such as signaling message weight and a base value for a network user.

23 Claims, 3 Drawing Sheets

(56) References Cited

U.S. PATENT DOCUMENTS

| | | | |
|---|---|---|---|
| 2012/0140624 A1* | 6/2012 | Denman | H04L 41/0816 370/230.1 |
| 2013/0039176 A1 | 2/2013 | Kanode et al. | |
| 2013/0275583 A1 | 10/2013 | Roach et al. | |
| 2015/0049605 A1* | 2/2015 | Mann | H04L 67/1097 370/230 |

OTHER PUBLICATIONS

European Search Opinion dated Oct. 3, 2016 from corresponding EP Application No. 15700107.4, 4 pages.
International Search Report dated Mar. 10, 2015 from corresponding PCT/EP2015/050230, pp. 3.
International Written Opinion dated Mar. 10, 2015 from corresponding PCT/EP2015/050230, pp. 4.
International Preliminary Report on Patentability dated Aug. 23, 2016 from corresponding PCT/EP2015/050230, pp. 5.

* cited by examiner

NETWORK SIGNALING INTERFACE AND METHOD WITH ENHANCED TRAFFIC MANAGEMENT DURING SIGNALING STORMS

INTRODUCTION

Field of the Invention

The invention relates to traffic management in mobile and wireless networks.

Since introduction of the Diameter protocol as a main signaling channel in 4G-LTE and 3G networks, overload protection of the core mobile network elements is becoming an important challenge for the network owning companies (such as mobile network operators).

Exponential growth of devices that are using the latest generation of the high speed networks gives rise to challenging requirements on the mobile network capacity including signaling Diameter based networks. These demands become critical during peak situations, resulting in so-called "Diameter signaling storms". During such storms parts of the network or certain network elements can become overloaded due to the number of Diameter messages. As a result (partial) network outages can be experienced. In order to prevent these situations, efficient protection mechanisms should be employed preventing denial-of-service situations.

Such mechanisms would benefit from consolidation of Diameter flows in the network by enabling a Diameter relay or proxy function that would cater for a centralized network architecture providing a signaling control point. A function like that is usually provided by Diameter Signaling Controllers (DSC) that support different load-balancing mechanisms using various strategies based on traffic weight and/or priority. Nonetheless, in case of overloaded Diameter destination peers, new Diameter sessions or signals to these peers have to be discarded or delayed, preventing them from a total outage.

In the majority of cases, DSCs will implement mechanisms that would throttle incoming Diameter signals once certain thresholds of outgoing traffic are reached. Resuming transmission to an overloaded destination peer will take place only when required processing bandwidth is detected.

Recently the $3^{rd}$ Generation Partnership Project (3GPP) standardization organization has introduced a Diameter overload control mechanism that is based on exchanging overload information between Diameter nodes that results in server nodes requesting reduction of traffic from client nodes. The detailed description is captured in a technical report (3GPP TR 29.809) available on 3GPP web site.

US2011/0158090 (Riley et al) describes a signaling message system having a policy selection module for receiving a notification of a network condition and determining, based on the network condition, policy information for a plurality of associated subscribers as opposed to per subscriber approach. The approach is an optimization of the existing Diameter signaling framework as defined in 4G networks.

However, such an approach might still lead to service loss for critical applications or for network users, people or applications.

The invention addresses these problems.

Glossary

Term Definition

3GPP $3^{rd}$ Generation Partnership Project. The organisation that publishes and maintains the GSM-based standards from 2G through 3G to 4G.

AVP Attribute-Value Pair—basic unit inside Diameter message that carries the Data (e.g. Authentication Data, Security Data, Data pertaining to Applications, etc.)

DEA Diameter Edge Agent—functional element an EPC network that provides interworking between multiple mobile network operators. It also serves as an interworking function between MAP-based and Diameter-based interfaces.

DRA Diameter Routing Agent—functional element in EPC network introduced by 3GPP to allow mobile network operators to deploy multiple PCRF elements in their networks.

DSC Diameter Signaling Controller—functional element in EPC network that provides central control and management of diameter signaling traffic. It is responsible for providing real-time routing capabilities to ensure that all messages are routed amongst the correct element of a network. Depending on its application in the network (i.e. the use case), it can incorporate the role of DRA, DEA, load balancer or interworking function between 2G-3G-4G networks.

EPC Evolved Packet Core—the main component of SAE architecture also known as SAE Core. The EPC serves as the equivalent of GPRS networks (via the MME, SGW, PGW subcomponents)

GSMA GSM Association is an association of mobile operators and related companies devoted to supporting the standardizing, deployment and promotion of the GSM mobile telephone system.

HPLMN Home PLMN relates to the relationship between each subscriber and the network operated by the operator he/she is subscribed to.

HSS Home Subscriber Server—central database that contains users' SAE subscription data such as the EPS-subscribed QoS profile and any access restrictions for roaming. It also holds information about the PDNs to which the user can connect. In addition, it holds dynamic information such as the identity of the MME to which the user is currently attached or registered. The HSS may also integrate the authentication centre (AUC), which generates the vectors for authentication and security keys.

LTE Long Term Evolution (also marketed as 4G LTE)—is a standard for wireless communication of high-speed data for mobile phones and data terminals. It is based on the GSM/EDGE and UMTS/HSPA network technologies, increasing the capacity and speed using a different radio interface together with core network improvements.

MAP Mobile Application Part is the signaling protocol used for call control, subscriber registration, short message service, etc.; MAP is used over many of the GSM network interfaces.

MME Mobility Management Entity—key control-node for the LTE access-network. It is responsible for idle mode UE (user equipment) tracking and paging procedures including retransmissions. It is involved in the bearer activation/deactivation process and is also responsible for choosing the SGW for a UE at the initial attach and at the time of intra-LTE handover involving Core Network (CN) node relocation. It is responsible for authenticating the user (by interacting with HSS).

OCS Online Charging System—functional element that allows a communication service provider to charge their customers, in real time, based on service usage.

OFCS Offline Charging System—functional element that allows a communication service provider to charge their customers for service usage in a non-real time fashion.

PCRF Policy and Charging Rules Function—core network component responsible for policy control decision-making, as well as for controlling the flow-based charging functionalities in the Policy Control Enforcement Function (PCEF), which resides in the PGW. The PCRF provides the QoS authorization (QoS class identifier [QCI] and bit rates) that decides how a certain data flow will be treated in the PCEF and ensures that this is in accordance with the user's subscription profile.

P-GW PDN Gateway is responsible for IP address allocation to the UE, as well as QoS enforcement and flow-based charging according to rules from the PCRF. It is responsible for filtering of downlink user IP packets into the different QoS-based bearers. P-GW performs QoS enforcement for guaranteed bit rate (GBR) bearers.

PLMN Public Land Mobile Network established and operated for the specific purpose of providing land mobile telecommunications services to the public. Each operator providing mobile services has its own PLMN.

SAE System Architecture Evolution—the core network architecture of 3GPP's LTE wireless communication standard.

S-GW Serving Gateway routes and forwards user data packets, while also acting as mobility anchor for the user plane during inter-eNodeB handovers and as the anchor for mobility between LTE and other 3GPP technologies. It also performs administrative functions in the visited networks such as collecting information for charging and lawful interception.

VPLMN Visited PLMN—when communications are handled over a network other than HPLMN, this PLMN is referred to as visited PLMN.

SUMMARY OF THE INVENTION

According to the invention, there is provided a signaling interface controller for a communications network, the controller being configured to dynamically manage signaling traffic by executing a self-learning algorithm in real time to make decisions as to how to handle each of a plurality of incoming signaling messages during a signaling message storm, in which the controller is configured to dynamically calculate and use per-message values to execute the algorithm and to make said decisions.

In one embodiment, the controller is configured to, in real time, for each of a plurality of signaling messages, calculate a dynamic value of network user (Fdu) according to criteria associated with the nature of the signaling messages, and to use said dynamic value in executing said algorithm. Preferably, the controller is configured to calculate said dynamic value (Fdu) based on associated signaling messages with associated weights. Preferably, there is a weight for a signaling message for a particular peer or group of peers, in which the weight of the signaling message is determined automatically according to criteria selected from message origination, addressed services, user location, source application, and destination application.

In one embodiment, the controller is configured to modify said dynamic network user value (Fdu) according to a base network user value (Fbu) to provide a current network user value (Fcu). Preferably, the controller is configured to modify the current network user value (Fcu) according to the message base value (Fbsig) to provide a signal value (Fsig). In one embodiment, the controller is configured to compute in real time an average of the signal values (Fsig) addressed to a peer to provide a dynamic average value for the peer (Fp).

In one embodiment, the controller is configured to make said decision according to comparison of the message value (Fsig) and the average peer value (Fp).

In one embodiment, the controller is adapted to interface with core network nodes selected from one or more of an MME, a HSS, a PCRF, an S-GW, a P-GW, a P/S/I-CSCF, an OCS, and an OFCS. Preferably, the controller is configured to perform said real time processing before attempting to perform tasks for signal delivery to the peer.

In one embodiment, the controller is configured to perform said real time processing before attempting to perform tasks establishing a new signaling interface protocol session to the destination peer. In one embodiment, the controller is configured to perform said real time processing for signals terminating in another network.

In one embodiment, the controller is configured to perform said real time processing for signals relayed by a Diameter Routing Agent or a Diameter Proxy Agent, or a Diameter Edge Agent (DEA).

In one embodiment, the controller is configured to perform said real time processing including inspection of all relevant diameter AVPs in the signaling message.

In one embodiment, the controller is configured to perform said real time processing when the receiving peer is an element of an MME, or is an element of a PCRF or an element of an HSS, or an element of an OCS or OFCS. In one embodiment, the controller is configured to make the results of the real time processing available for a reporting system attached to the network. In one embodiment, the controller is configured to make the results of the real time processing available for an analytical system attached to the network.

In another aspect, the invention provides a method performed by a signaling interface controller in a communications network, the method comprising the controller dynamically managing signaling traffic by executing a self-learning algorithm in real time and making decisions in real time as to how to handle each of a plurality of incoming signaling messages during a signaling message storm, in which the controller dynamically calculates and uses per-message values to execute the algorithm and to make said decisions.

In one embodiment, the controller, in real time, for each of a plurality of signaling messages, calculates a dynamic value of network user (Fdu) according to criteria associated with the nature of the signaling messages, and uses dynamic value in executing said algorithm. Preferably, the controller calculates said dynamic value (Fdu) based on associated signaling messages with associated weights.

In one embodiment, there is a weight for a signaling message for a particular peer or group of peers, in which the weight of the signaling message is determined automatically according to criteria selected from message origination, addressed services, user location, source application, and destination application. In one embodiment, the controller modifies said dynamic network user value (Fdu) according to a base network user value (Fbu) to provide a current network user value (Fcu).

In one embodiment, the controller modifies the current network user value (Fcu) according to the message base value (Fbsig) to provide a signal value (Fsig). In one embodiment, the controller computes in real time an average of the signal values (Fsig) addressed to a peer to provide a dynamic average value for the peer (Fp). Preferably, the controller makes said decision by comparing the message value (Fsig) and the average peer value (Fp).

In one embodiment, said method is performed before attempting to perform tasks for signal delivery to the peer. In one embodiment, said method is performed before attempting to perform tasks establishing a new session to the destination peer.

In one embodiment, said method is performed for signals originating in another network. In one embodiment, said method is performed for signals terminating in another network.

In one embodiment, said method is performed for signals relayed by a routing agent such as a Diameter Routing Agent, or by a proxy agent such as a Diameter Proxy Agent, or by an edge agent such as a Diameter Edge Agent (DEA). Preferably, said method includes inspection of all relevant AVPs in a Diameter signal.

In one embodiment, the method is performed when a receiving peer is an element of a PCRF or an element of a HSS or an element of an OCS or OFCS. In one embodiment, results of evaluations are used for a reporting system attached to the network. In one embodiment, results of the evaluations are used by an analytical system attached to the network.

In a further aspect, the invention provides a computer readable medium comprising software code for implementing the steps of a method as defined above in any embodiment when executing on a digital processor.

DETAILED DESCRIPTION OF THE INVENTION

The invention will be more clearly understood from the following description of some embodiments thereof, given by way of example only with reference to the accompanying drawings in which:—

DESCRIPTION OF THE EMBODIMENTS

Figure 1:
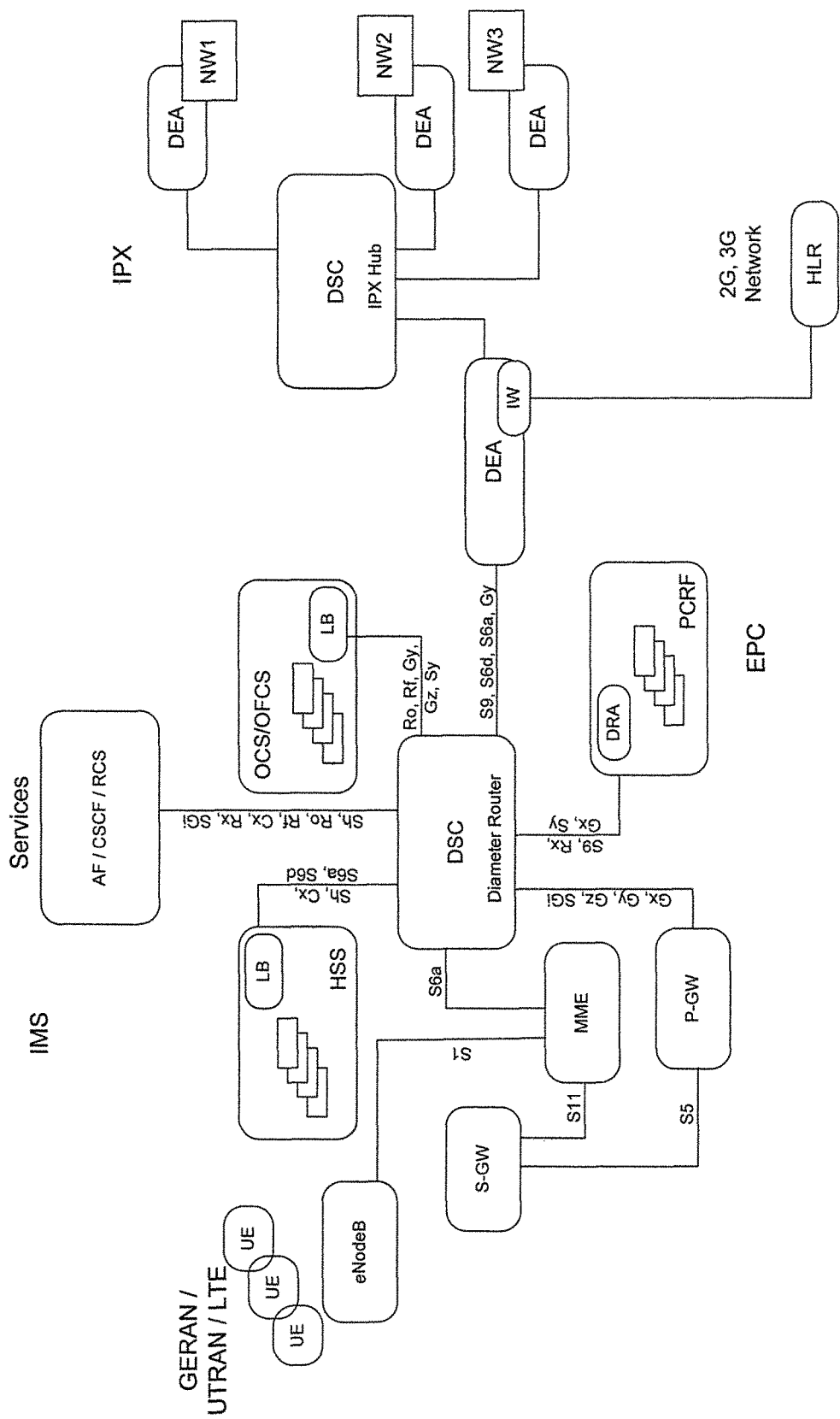
FIG. 1 is a diagram illustrating a 4G LTE core network architecture which implements the invention.

The invention provides components which perform dynamic signaling management in networks such as Evolved Packet Core (EPC) networks that rely on Diameter signaling interfaces.

The invention is directed towards reducing the impact of message storms on a network. The prior approach to this problem has been to optimize the existing standardized mechanisms or otherwise control traffic at network elements based on global network conditions, or where subscribers are considered, to act in accordance with pre-configured subscriber policies.

On the other hand, in the invention the signaling interface controller executes a self-learning algorithm to dynamically manage traffic based on the particular nature of each of a number of signaling messages. It may use pre-configured criteria for individual subscribers, such as subscriber QoS contracts, but only as one input into the algorithm. The most important inputs are the nature of the signaling messages.

This achieves much more intelligent traffic management during message storms.

The actions that are typically taken in response to the output of the algorithm result in filtering the traffic most valuable to the service provider.

In various embodiments, the invention provides a method to dynamically differentiate the importance of each signaling message involved in a signaling exchange. The signaling exchange may be according to a protocol such as the Diameter protocol. Taking the example of the Diameter protocol the method has the following steps in various embodiments:

receiving a signaling message such as a Diameter signal for a specific Diameter peer or group of peers (a group of hardware component peers form a single logical network element);

calculating a dynamic value based on signaling weight;

determining a current value for the network user based on the above dynamic value and a preconfigured value such as QoS policy or criteria for that network user;

calculating an average value of the specific peer or group of peers based on overall statistical evaluation of the traffic towards these destinations; and deciding on the signaling message delivery to the destination peer based on comparing the current value of the signaling message (or a value derived from it) and the statistical evaluation of this traffic towards this peer or group of peers.

The above processing is performed before attempting to perform tasks for signal delivery to the peer, such as establishing a new Diameter session to the destination peer. It may be performed for the signals originating in another network or for the signals terminating in another network or for the signals relayed by a Diameter Routing Agent or for the signals relayed by the Diameter Proxy Agent or for the signals relayed by a Diameter Edge Agent.

The self-learning algorithm processing may include inspection of all relevant AVPs in the Diameter signal. Also, it may use as an input a fixed value based on the provisioned list of the network users, and it may include inspection of a combination of the calculated value with the directly provisioned value.

The receiving peer may be an element of the PCRF or of the HSS or of the OCS or OFCS. The results of the evaluations may be used for any reporting systems attached to the mobile network and/or they may be used for any analytical systems attached to the mobile network.

It will be appreciated that the dynamic traffic management is self-adjusting because it achieves user-based and message-based service control during overload situations. The algorithm is self-adjusting on the basis of comparing network user signaling and peer group values which are dynamically determined. The dynamic determination of these values is based on items such as signaling message weight and a base value for a network user.

Although the main characteristics of 4G LTE networks were the speed and efficiency of the radio interfaces, equally significant became the implications of an end-to-end IP network architecture. It will be appreciated that the invention supports a diverse mix of high-value, real-time and lower-value, best-effort services over a common IP infrastructure.

The invention addresses the challenge of managing the network capacity and its corresponding complexity. In a vast majority of cases mobile network operators rely on introduction of centralized points of signaling traffic control such as Diameter signaling controllers (DSC) that can be positioned to address different use cases.

FIG. 1 represents an evolved packet system network with the multitude of such uses cases.

The invention allows service differentiation in case of an overloaded network based on pattern detection of network usage per user (be it a subscriber or service application).

By means of this algorithm, control of the signaling traffic load is determined using the following criteria:
(a) Value definition of the specific diameter signaling message;
(b) Value estimation of the particular network user based on statistical evaluation of each related Diameter signaling message;
(c) Average value estimation of specific peer or group of peers based on overall statistical evaluation of traffic routed to these destinations.

A benefit of this approach is having it enabled on a centralized core network function such as a DSC, which allows pre-emptive Diameter signaling traffic control, i.e. before it actually reaches the rest of the elements of the core network. This minimizes the impact of overload situations while increasing service availability for valuable users of the network.

Figure 2:
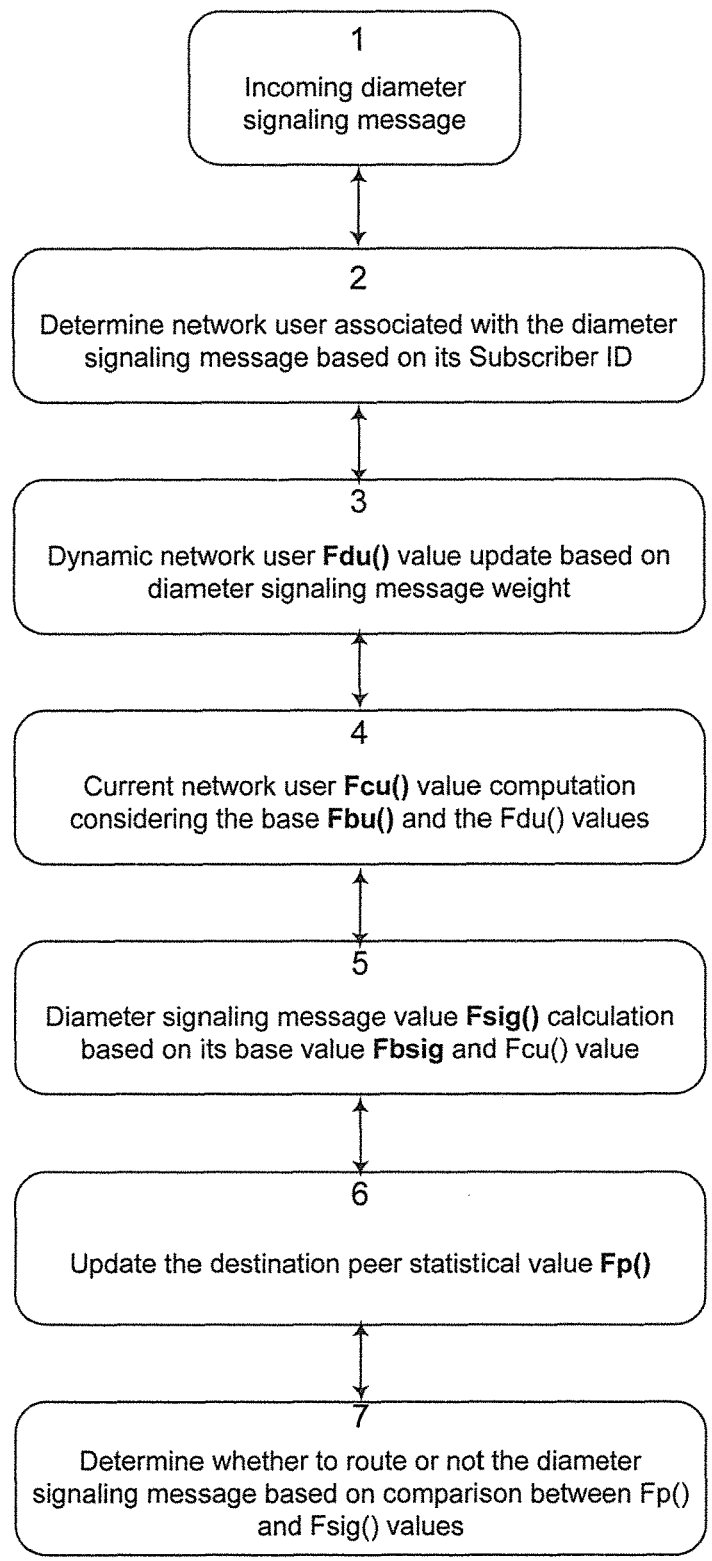
FIG. 2 is a flow diagram illustrating a self-adjusting algorithm of the invention for handling message storm situation.
Figure 3:
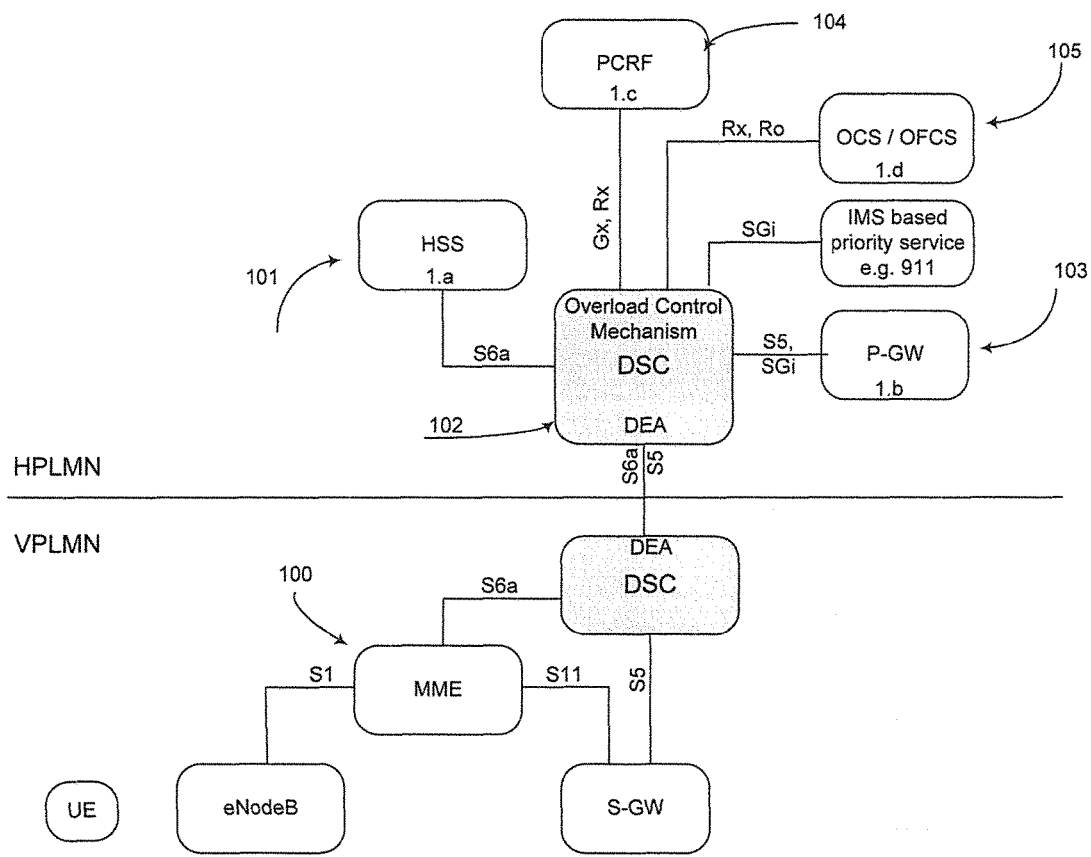
FIG. 3 illustrates signaling flow of the invention.

As noted above, FIG. 1 shows an LTE core diameter network architecture underlying the various use cases that can be fulfilled by a Diameter Signaling Controller with the focus on its central function in such a network. FIG. 2 is a flow diagram for calculating the different values required to determine the actions. FIG. 3 is a snapshot of a typical Diameter signaling flow.

Referring in detail to FIG. 2, a number of steps are identified based on which the DSC allows Diameter signaling traffic control so that the services offered by a network operator can still be guaranteed when in an overload situation. This is based on a combination of predefined as well as statistically computed values of the signaling traffic passing through a central function in the network like a DSC.

The following describes the steps identified in FIG. 2:
1. A Diameter signaling message triggered by a network user is routed towards a peer or peer group and through a network element (DSC);
2. The network user (e.g. subscriber, application) associated with the received Diameter signaling message is determined based on its Subscriber ID;
3. A dynamic value $Fdu()$ determined based on associated signaling messages with various weights. An example is a predefined weight for this Diameter signaling message for a particular peer or group of peers where the weight of the message is determined automatically considering various criteria such as message origination or addressed services. The weight is a static value per message per network element. $Fdu()$ is therefore a dynamic value representing the nature of the service. It is based on various message parameters such as different AVPs, the user location, and the source or the destination application. For example, if a particular subscriber accesses the Internet while at home versus while roaming on holiday there will be a different $Fdu()$ value calculated because the nature of service to be applied varies.
4. A current (actual) value $Fcu()$ is computed based on the $Fdu()$ value and a predefined base value $Fbu()$ for that user. The base value $Fbu()$ is preconfigured by the network operator according to QoS policy for the particular network user (e.g. VIP, emergency numbers). This step links the algorithm with the existing QoS capabilities as defined by 3GPP standardization body.
5. A value $Fsig()$ of the Diameter signaling message is calculated using a predefined base value $Fbsig()$ of the message and the $Fcu()$ value. The base value of the Diameter signaling message identifies the importance of the message in relation with other Diameter signaling messages.
6. A statistical value $Fp()$ of the peer or a group of peers is determined. It represents a statistical average of all $F_{sig}$ values of the entire signaling traffic towards this particular peer or group of peers.
7. A decision to proceed with handling the Diameter signaling message or not is taken based on the comparison of $Fsig()$ and $Fp()$ values.

Referring to FIG. 3, by the way of example a subscriber roaming in a visited PLMN (VPLMN) tries to access a service from its home PLMN (HPLMN).
1.a The roaming user is connected to the radio access network (i.e. eNodeB) of the VPLMN. The local MME 100 authenticates the request by interrogating the HSS 101 of the HPLMN. The Diameter signaling message passes through the DSC 102 functional element of HPLMN, where it gets inspected and $Fsig()$ and $Fp()$ values are computed as part of the proposed invention.
1.b Once the user is authenticated, the process of allocating IP addresses is started by engaging the P-GW 103 in HPLMN. The corresponding Diameter signaling messages are transferred over a different 3GPP interface and as such are assigned different $Fsig()$ values as part of the proposed invention. Similarly, the $Fp()$ value is different as another destination peer is addressed. Subsequently, the value $Fsig()$ and $Fp()$ are compared on DSC 102 and the corresponding decision on signal handling is taken.
1.c The next messages (from this user) are subjected to the policy control and charging rules as defined on PCRF 104 in HPLMN in order to provide QoS authorization in accordance with subscriber's profile. Again, PCRF-related Diameter signaling messages are transferred over different 3GPP interfaces and as such these messages are assigned different $Fsig()$ values as well as a new $Fp()$ value is computed, resulting into decision to process the new signal based on different $Fsig()$ and $Fp()$ values on DSC 102.
1.d Similar to 1.a, 1.b, and 1.c, charging of service is based on Diameter signaling messages using yet another 3GPP protocol defined to interface with on-line or off-line charging systems OCS/OFCS 105 in HPLMN. Same as before, different $Fsig()$ and $Fp()$ values are computed and compared on DCS 102.

As a snapshot of a typical signaling flow, the described steps above demonstrate how each and every Diameter signaling message is evaluated based on the network user usage of the network vs the current load of the network element this message is addressed to/for.

It will be appreciated that the invention achieves dynamic, real time, traffic management in overload situations in a manner which is more intelligent, because it is based on the nature of specific messages, rather than pre-configured criteria such as user QoS policy values. This provides both a better user experience because the controller will be able to avoid taking actions that affect important messages, but will be able to manage a message storm by only affecting less important messages. It will also be appreciated that the real time processing of the invention can co-exist with existing signaling message processing. It learns the patterns of network usage of individual subscribers, prioritizing them based on their values resulting from, for example, their location and the accessed services. Due to the dynamic nature of the network usage, the algorithm enables the prioritization of subscribers that are not necessary part of a VIP-like QoS category, allowing the network to identify and secure network resources for the most important subscribers at any given point in time.

The invention is not limited to the embodiments described but may be varied in construction and detail. For example, the invention may be applied to signaling interface protocols other than Diameter. Also, it may be implemented by a network element other than a DSC, and indeed any network element which received or can probe the signaling messages could implement the invention.

The invention claimed is:

1. A signaling interface controller (DSC) for a communications network, the signaling Interface controller comprising a processor and a non-transitory computer-readable medium comprising software code that causes said processor to:
   (a) dynamically manage signaling traffic by real time processing with execution of a self-learning algorithm to make a decision per signaling message as to how to handle each of a plurality of incoming signaling messages during a signaling message storm before attempting to perform tasks for signal delivery to a destination peer, and
   (b) dynamically calculate and use per-message values to execute the self-learning algorithm by, for each signaling message of a plurality of signaling messages executing operations of:
       calculating a dynamic network user value (Fdu) according to criteria associated with nature of said signaling message;
       providing a current network user value (Fcu) by modifying said dynamic network user value (Fdu) according to a base network user value (Fbu);
       providing a signal value (Fsig) by modifying the current network user value (Fcu) according to a message base value (Fbsig) identifying importance of said signaling message in relation to others of said plurality of signaling messages;
       providing a dynamic average peer value (Fp) for a peer by computing an average of a plurality of signal values (Fsig) addressed to said peer; and
       making said decision according to comparison of the signal value (Fsig) and the dynamic average peer value (Fp).

2. The signaling interface controller of claim 1, wherein the software code causes the processor to calculate said dynamic network user value (Fdu) also based on a weight associated with said signaling message.

3. The signaling interface controller of claim 2, wherein there is a weight for a signaling message for a particular peer or group of peers, in which the weight of the signaling message is determined automatically according to criteria selected from message origination, addressed services, user location, source application, and destination application.

4. The signaling interface controller of claim 1, wherein the signaling interface controller is adapted to interface with core network nodes selected from one or more of a Mobility Management Entity (MME), a Home Subscriber Server (HSS), a Policy and Charging Rules Function (PCRF), a Serving Gateway (S-GW), a Public Data Network (PDN) Gateway (P-GW), a Call Session Control Function (CSCF), an Online Charging System (OCS), and an Offline Charging System (OFCS).

5. The signaling interface controller of claim 1, wherein the software code causes the processor to perform said real time processing before attempting to perform tasks establishing a new signaling interface protocol session to the destination peer.

6. The signaling interface controller of claim 1, wherein the software code causes the processor to perform said real time processing for signals terminating in another network.

7. The signaling interface controller of claim 1, wherein the software code causes the processor to perform said real time processing for signals relayed by a Diameter Routing Agent or a Diameter Proxy Agent, or a Diameter Edge Agent (DEA).

8. The signaling interface controller of claim 1, wherein the software code causes the processor to perform said real time processing including inspection of all relevant diameter AVPs in the signaling message.

9. The signaling interface controller of claim 1, wherein the software code causes the processor to perform said real time processing when the destination peer is an element of a Mobility Management Entity (MME), or an element of a Policy and Charging Rules Function (PCRF), or an element of a Home Subscriber Server (HSS), or an element of an Online Charging System (OCS), or an element of an Offline Charging System (OFCS).

10. The signaling interface controller of claim 1, wherein the software code causes the processor to make results of the real time processing available for a reporting system attached to the communications network.

11. The signaling interface controller of claim 1, wherein the software code causes the processor to make results of the real time processing available for an analytical system attached to the communications network.

12. A method performed by a signaling interface controller (DSC) in a communications network, the method comprising:
    (a) dynamically managing signaling traffic by real time processing with execution of a self-learning algorithm and making a decision per signaling message in real time as to how to handle each of a plurality of incoming signaling messages during a signaling message storm before attempting to perform tasks for signal delivery to a destination peer; and
    (b) dynamically calculating and using per-message values to execute the self-learning algorithm by, for each signaling message of a plurality of signaling messages:
        calculating a dynamic network user value (Fdu) according to criteria associated with nature of a signaling message;
        providing a current network user value (Fcu) by modifying said dynamic network user value (Fdu) according to a base network user value (Fbu);
        providing a signal value (Fsig) by modifying the current network user value (Fcu) according to a message base value (Fbsig) identifying importance of the signaling message in relation to other signaling messages of said plurality of signaling messages;
        providing a dynamic average peer value (Fp) for a peer by computing an average of a plurality of signal values (Fsig) addressed to said peer; and
        making said decision according to comparison of the signal value (Fsig) and the dynamic average peer value (Fp).

13. The method of claim 12, wherein the signaling controller calculates said dynamic network user value (Fdu) also based on a weight associated with said signaling message.

14. The method of claim 13, wherein there is a weight for a signaling message for a particular peer or group of peers, in which the weight of the signaling message is determined automatically according to criteria selected from message origination, addressed services, user location, source application, and destination application.

15. The method of claim 12, wherein said method is performed before attempting to perform tasks establishing a new session to the destination peer.

16. The method of claim 12, wherein said method is performed for signals originating in another network.

17. The method of claim 12, wherein said method is performed for signals terminating in another network.

18. The method of claim 12, wherein said method is performed for signals relayed by a routing agent, or by a proxy agent, or by an edge agent.

19. The method of claim 12, wherein said method includes inspection of all relevant Attribute-Value Pairs (AVPs) in a Diameter signal.

20. The method of claim 12, wherein the method is performed when the destination on peer is an element of a Policy and Charging Rules Function (PCRF), or an element of a Home Subscriber Server (HSS), or an element of an Online Charging System (OCS), or an element of an Offline Charging System (OCFS).

21. The method of claim 12, wherein results of said real time processing are used for a reporting system attached to the communications network.

22. The method of claim 12, wherein results of said real time processing are used by an analytical system attached to the communications network.

23. A non-transitory computer-readable medium comprising software code for implementing the method of claim 12 when executing on a digital processor.

\* \* \* \* \*